United States Patent
Zhao et al.

(10) Patent No.: US 12,010,518 B2
(45) Date of Patent: Jun. 11, 2024

(54) SYSTEM AND METHOD FOR SECURELY DEFENDING AGAINST COLLUSIVE ATTACK UNDER INTERNET OF VEHICLES

(71) Applicants: XI'AN ANMENG INTELLIGENT TECHNOLOGY CO., LTD., Xi'an (CN); XI'AN UNIVERSITY OF POSTS & TELECOMMUNICATIONS, Xi'an (CN)

(72) Inventors: Feng Zhao, Xi'an (CN); Jingyu Feng, Xi'an (CN)

(73) Assignees: XI'AN ANMENG INTELLIGENT TECHNOLOGY CO., LTD., Xi'An (CN); XI'AN UNIVERSITY OF POSTS & TELECOMMUNICATIONS, Xi'An (CN)

( * ) Notice: Subject to any disclaimer, the term of this patent is extended or adjusted under 35 U.S.C. 154(b) by 404 days.

(21) Appl. No.: 17/612,720

(22) PCT Filed: Dec. 24, 2019

(86) PCT No.: PCT/CN2019/127707
§ 371 (c)(1),
(2) Date: Mar. 11, 2022

(87) PCT Pub. No.: WO2020/233114
PCT Pub. Date: Nov. 26, 2020

(65) Prior Publication Data
US 2022/0279352 A1    Sep. 1, 2022

(30) Foreign Application Priority Data
May 20, 2019 (CN) .......................... 201910418058.0

(51) Int. Cl.
*H04W 12/122* (2021.01)
*B60R 25/30* (2013.01)

(52) U.S. Cl.
CPC .......... *H04W 12/122* (2021.01); *B60R 25/30* (2013.01)

(58) Field of Classification Search
None
See application file for complete search history.

(56) References Cited

U.S. PATENT DOCUMENTS

| | | | |
|---|---|---|---|
| 2007/0149279 A1* | 6/2007 | Norden | H04L 67/104 463/29 |
| 2015/0058976 A1* | 2/2015 | Carney | H04L 63/1408 726/22 |
| 2018/0115898 A1 | 4/2018 | Han et al. | |

FOREIGN PATENT DOCUMENTS

| | | |
|---|---|---|
| CN | 103167019 A | 6/2013 |
| CN | 104717229 A | 6/2015 |

(Continued)

OTHER PUBLICATIONS

C. Tang, L. Wu, G. Wen and Z. Zheng, "Incentivizing Honest Mining in Blockchain Networks: A Reputation Approach," in IEEE Transactions on Circuits and Systems II: see: https://ieeexplore.ieee.org/abstract/document/8653347 (Year: 2019).*

(Continued)

*Primary Examiner* — Richard A Mccoy
(74) *Attorney, Agent, or Firm* — Sughrue Mion, PLLC (57) ABSTRACT

A system and method for securely defending against a collusion attack under Internet of Vehicles (IoV) are provided. The present disclosure can repair a vulnerability, of a reputation system in the IoV, that the IOC attackers can manipulate a traffic-related message aggregation model (TMAM) by increasing their own reputation scores in an inside-and-outside collusion (IOC) manner. In addition, the (Continued)

present disclosure can detect IOC attacks quickly to improve the security of the IoV; can eliminate suspicious providers recursively and provide a reputation fluctuation association rule, to avoid overload of the TMAM; and can deprive IOC attackers of the opportunity to improve their reputation scores and ensure credible information in the IoV, to ensure the fairness and availability of the TMAM without the interference from the IOC attackers.

3 Claims, 3 Drawing Sheets

(56) References Cited

FOREIGN PATENT DOCUMENTS

| CN | 105069627 | A | * | 11/2015 | |
| CN | 105809032 | A | * | 7/2016 | G06F 21/554 |
| CN | 107317801 | A | * | 11/2017 | |
| CN | 107431695 | A | | 12/2017 | |
| CN | 108400973 | A | | 8/2018 | |
| CN | 110139278 | A | | 8/2019 | |
| JP | 2005339118 | A | * | 12/2005 | |
| WO | WO-2016141510 | A1 | * | 9/2016 | G06Q 30/0631 |

OTHER PUBLICATIONS

E. Staab and T. Engel, "Collusion Detection for Grid Computing," 2009 9th IEEE/ACM International Symposium on Cluster Computing and the Grid, Shanghai, China, 2009, pp. 412-419 (Year: 2009).*

International Search Report of PCT/CN2019/127707, dated Mar. 23, 2020 [PCT/ISA/210].

* cited by examiner

SYSTEM AND METHOD FOR SECURELY DEFENDING AGAINST COLLUSIVE ATTACK UNDER INTERNET OF VEHICLES

CROSS REFERENCE TO RELATED APPLICATION(S)

This patent application claims the benefit and priority of Chinese Patent Application No. 201910418058.0 filed on May 20, 2019, the disclosure of which is incorporated by reference herein in its entirety as part of the present application.

TECHNICAL FIELD

The present disclosure relates to the fields of the Internet of Vehicles (IoV) technology and defense technology, in particular to a system and method for securely defensing against a collusion attack under IoV.

BACKGROUND ART

According to the definition of the China Internet of Things (IoT) School-Enterprise Alliance, the IoV is a huge interactive network including information such as locations, speeds, and routes of vehicles. Vehicles can acquire their own environment and status information by using GPS, RFID, sensors, image processing devices, and the like. Each vehicle can transmit the information to a central processing unit for analyzing and processing, to calculate best routes for different vehicles and report road conditions in time, so that the IoV system arranges signal light cycles and the like.

Figure 1:
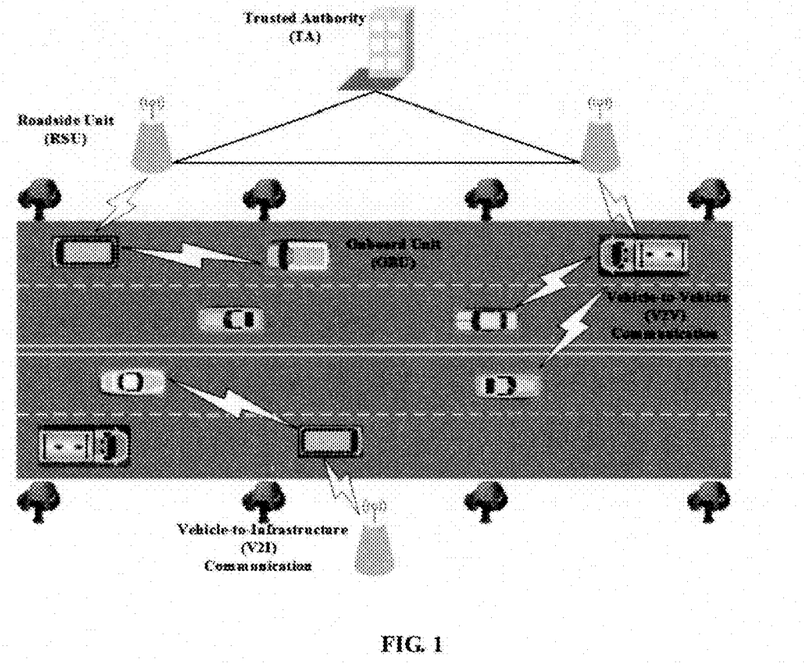
FIG. 1 is a schematic diagram of an IoV system model.

According to survey research, it is estimated that the quantity of registered vehicles will reach 2 billion in the next 10 to 20 years. The IoV including a large quantity of infrastructures and smart vehicles serves as the basis of an intelligent transportation system. Vehicle-to-vehicle (V2V) communication and vehicle-to-infrastructure (V2I) communication are established based on the IoV to promote vehicles to cooperate with each other and share traffic-related information such as road conditions and traffic congestion. As shown in FIG. 1, through the V2V communication, a vehicle can exchange information with a nearby vehicle. Through the V2I communication, a vehicle can directly exchange information with roadside units (RSUs). Dedicated short-range communication (DSRC) radio and IEEE standards may be used for the V2V and V2I communications in the IoV.

Vehicles are equipped with on-board units, namely sensors, resource command processors, storage and communication devices for acquiring, processing and sharing data. With the help of the on-board units, vehicles can automatically detect traffic-related events and send warning information to others according to the V2V communication standard. The information helps vehicles to know about the traffic situations in time, thereby improving the efficiency of traffic safety. In the exchange of traffic-related messages, each vehicle can play two roles, namely, the role of providing messages and the role of receiving messages.

However, due to the IoV characteristics such as the high mobility and high fluctuation, adjacent vehicles are always disconnected and do not know each other. This provides an opportunity for malicious vehicles to deliberately spread misinformation. For example, a malicious vehicle reports a message claiming that the road is clear. When a traffic accident or congestion occurs, the misinformation is quite likely to endanger traffic safety and reduce the efficiency of the transportation system.

In addition, the misinformation not only may reduce transportation efficiency, but also may cause accidents or even threaten human lives. For example, a vehicle ($V_a$) broadcasts a message that it is out of control to warn the vehicle behind it. When a vehicle $V_b$ receives this warning message, it is quite important for $V_b$ to determine the credibility of this message and make a quick decision. Due to the limited time, it is impractical to ask a nearby vehicle or a credible third party to verify the authenticity of the information. If this warning message is false, it is dangerous for $V_b$ to brake. Therefore, in the IoV, how to effectively establish a trust relationship between vehicles is quite important. We hope that every vehicle can detect malicious vehicles and misinformation reported by them.

A reputation system (also referred to as a trust management scheme) enables vehicles to determine whether a received message is credible, and also provides a basis for network operators to reward and punish specific vehicles. In general, a reputation score of a vehicle may be calculated by scoring its past behaviors.

With the help of the reputation system, a consumer using the reputation system can collect all information about a traffic event, filter out misinformation reported by malicious vehicles, and only detect credible information. Then, after aggregating all traffic messages by using a specific model, the consumer makes a quick decision based on, for example, a principle of majority decision. A traffic-related message aggregation model (TMAM) may be managed by a cloud server of the central IoV or by the RSU in the distributed IoV. Finally, the consumer may generate ratings for the messages based on the final result of the event, and upload the ratings to update the reputation score of the vehicle providing the messages.

Figure 2:
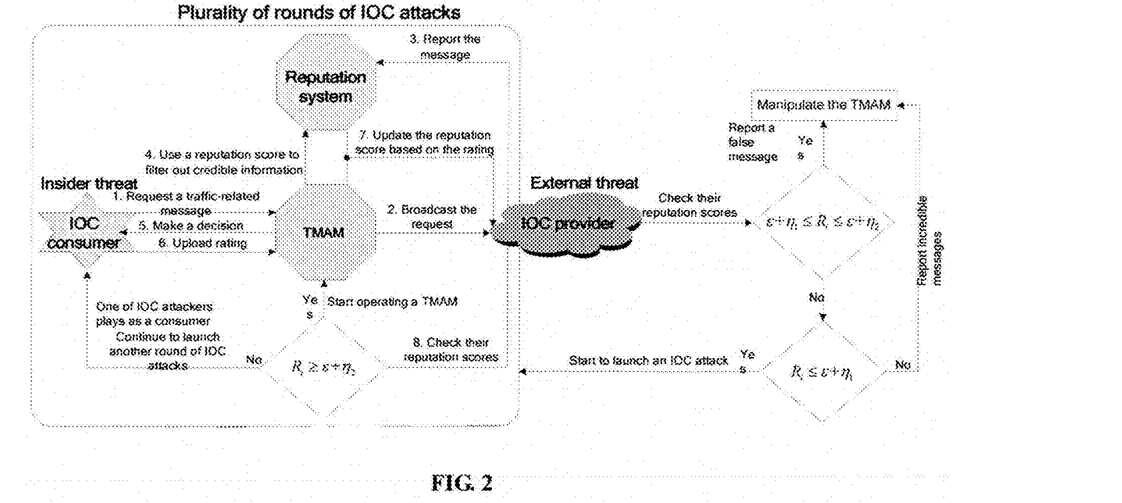
FIG. 2 is a schematic diagram of an IOC attack strategy.

An inside-and-outside collusion (IOC) attack strategy is shown in FIG. 2. IOC attackers are extremely sensitive to their reputation scores. They begin to launch IOC attacks under constraints, and a reputation score Ri expression is generally:

$$R_i \le \varepsilon + \eta_1.$$

If $V_i$ is one of the attackers, $R_i$ is a reputation score of $V_i$, and each $R_i \in [0,1]$. A reputation score threshold ($\varepsilon$) is usually set to a moderate value such as 0.5. $R_i$ is calculated in the following formula (1) when cre=inc. $R_i > \varepsilon$ indicates a relatively high reputation score, which means that a message of the vehicle can be accepted by the TMAM. This makes the IOC attackers find an attack process to prompt their reputation scores. When $R_i \le \varepsilon + \eta_1$, $V_i$ stops forging traffic-related information and asks one of its adjacent accomplices to launch an IOC attack to improve its reputation score. In this case, other accomplices may free ride while improving their reputation scores, when $\varepsilon + \eta_1 \le R_i \le \varepsilon + \eta_2$, where $\eta_1$ ($0 \le \eta_1 < \varepsilon$) is a reputation warning line. It is too late to increase the reputation scores when $R_i < \varepsilon$. In such a case, the IOC attacker is marked as a suspicious vehicle, and TMAM does not trust it. This attack mode continues until $R_i < \varepsilon$. $\eta_2 (\eta_1 < \eta_2 \le \varepsilon)$ is a high reputation line.

In the related art, the reputation systems may be classified into two categories: centralized reputation systems and decentralized reputation systems.

In the centralized reputation systems, all ratings are stored and processed in a central server such as a cloud server. Because the vehicles usually need to make decisions within a relatively short delay, the centralized systems are not always able to meet the stringent quality of service (QoS) requirements of the IoV.

In the decentralized reputation systems, the reputation calculation task is performed in the vehicle or the RSU. Local management of reputation scores may reduce interaction with network infrastructures.

In the reputation systems, one of the most popular designs is based on the beta function. In this design, quantities of credible and malicious actions carried out by vehicles are calculated first. Then, the reputation scores are calculated by using the beta function.

When a piece of information ($m_i$) is reported by $V_i$, if $m_i$ is as true as the traffic-related information evaluated by consumers, $m_i$ is considered as credible information. Otherwise, $m_i$ is considered as misinformation. The reputation system calculates a quantity ($cre_i$) of credible messages reported by the vehicle $V_i$ and a quantity ($inc_i$) of pieces of misinformation reported by $V_i$. The reputation score of $V_i$ is calculated by using the beta function as:

$$R_i = \frac{cre_i + 1}{cre_i + inc_i + 2}. \quad (1)$$

However, the reputation system may be used by the IOC attackers to improve their reputation scores, thereby manipulating the TMAM.

SUMMARY

To resolve the foregoing problem, the present disclosure provides a system and method for securely defensing against a collusion attack under IoV, to effectively avoid the defect, in the related art, that IOC attackers may use the reputation system to improve their reputation scores, thereby manipulating a TMAM.

To overcome the shortcoming in the related art, the present disclosure provides solutions of the system and method for securely defensing against a collusion attack under IoV below.

The system for securely defensing against a collusion attack under IoV includes a cloud server of an IoV platform or a RSU in a distributed IoV; and an on-board unit disposed on a vehicle, where the on-board unit is connected to the cloud server of the IoV platform or the RSU in the distributed IoV; the on-board unit includes a processor, and the processor is connected to a wireless communication module and a memory.

The cloud server of the IoV platform or the RSU in the distributed IoV includes a TMAM; and the TMAM is configured to store a historical message from a provider and historical rating data of a consumer at the end of a voting campaign consuming traffic.

The method for securely defensing against a collusion attack under IoV is performed on a cloud server of an IoV platform or a RSU in a distributed IoV and includes:

detecting an IOC attack by using a reputation fluctuation association analysis (RFAA) method, analyzing a reputation fluctuation characteristic, and deleting an unlikely IOC provider from all providers in a current event voting operation consuming traffic.

The RFAA includes:

(1) supporting data management for detecting an IOC attack, where the supporting data management for detecting the IOC attack includes two-step-based processing message report and consumer rating, and methods of the two-step-based processing message report and consumer rating are specifically as follows:

a TMAM should store a historical message from a provider and historical rating data of a consumer at the end of a voting campaign consuming traffic, the provider provides a message for an on-board unit of a vehicle, and the consumer receives a message for the on-board unit of the vehicle and rates the message to complete the two-step-based processing message report; and each vehicle $V_i$ is assigned to a P-C table, the P-C table stores the message reported previously by the provider on the vehicle, messages provided by the all providers, and ratings of $V_i$ when the vehicle serves as the consumer, to complete the consumer rating, and (2) obtaining a reputation fluctuation association rule, where the obtaining reputation fluctuation association rule supports the detection of the IOC attack, and the reputation fluctuation association rule is obtained by analyzing a characteristic of the IOC attack.

The P-C table is shown in Table 1:

TABLE 1

| sn | vt | P_ID (message) | | | | | C_ID (rating) |
|---|---|---|---|---|---|---|---|
| 1 | $vt_i^1$ | $V_1 (m_1)_1$ | $V_2 (m_2)_1$ | ... | $V_j (m_j)_1$ | ... $V_n (m_n)_1$ | $V_i (t)_1$ |
| 2 | $vt_i^2$ | $V_1 (m_1)_2$ | $V_2 (m_2)_2$ | ... | $V_j (m_j)_2$ | ... $V_n (m_n)_2$ | $V_i (t)_2$ |
| ... | ... | ... | ... | ... | ... | ... | ... |
| h | $vt_i^h$ | $V_1 (m_1)_h$ | $V_2 (m_2)_h$ | ... | $V_j (m_j)_h$ | ... $V_n (m_n)_h$ | $V_i (t)_h$ | where sn represents a number of a voting action of a traffic-related event, and h represents a quantity of voting actions that are related to a traffic event and initiated by the vehicle $V_i$;

vt represents a voting time when the vehicle $V_i$ requests a voting action of a traffic-related event, $Vt_i^h$ represents a latest voting time of the vehicle $V_i$ at an $h^{th}$ time, and h is a natural number;

P_ID (message) includes an ID assigned to the provider and its historical message, and in $V_j(m_j)_h$, $V_j$ represents an ID of a $j^{th}$ provider, $(m_j)_h$ represents an $h^{th}$ message in a voting operation of a traffic-related event, and i, j, and n are natural numbers and sequence numbers assigned to the vehicle; and C_ID (rating data) includes an ID of the consumer and its historical rating, and in $V_i(t)_h$, $V_i$ represents an ID of an $i^{th}$ consumer, $(t)_h$ represents a corresponding real grade in an $h^{th}$ voting action of a traffic-related event, and i, j, and n are natural numbers and sequence numbers assigned to the vehicle.

A method of obtaining the reputation fluctuation association rule includes:

step 1-1: initializing a value of an index variable $\mu_i$ of a reputation fluctuation index to 0;

step 1-2: setting an initial value of an integer variable k to 1;

step 1-3: comparing the value of the integer variable k with h, where if k>h, the comparison is finished, and the method of obtaining the reputation fluctuation association rule is obtained; and if k≤h, $R^k_i \geq \varepsilon+\eta_2$, $R^k_i \leq R^{k-1}_i$, $R^k_i$ continuously decreases, and $R^k_i \leq \varepsilon+\eta_1$, $\mu_i=\mu_i+1$, where h is a quantity of voting actions that are related to a traffic event and initiated by a vehicle $V_i$, $R^k_i$ represents a $k^{th}$ reputation score of the vehicle $V_i$, $\varepsilon$ as a reputation score threshold is always set to a moderate value in a range of 0 to 1, for example, 0.5, a value range of $\eta_1$ as a reputation warning line is $0 \leq \eta_1 < \varepsilon$, and a value range of $\eta_2$ as a high reputation line is $\eta_1 < \eta_2 \leq \varepsilon$;

step 1-4: if $R^k_i \leq \varepsilon + \eta_1$, $R^k_i \geq R^{k-1}_i$, $R^k_i$ continuously decreases, and $R^k_i \geq \varepsilon + \eta_2$, $\mu_i = \mu_i + 1$; and step 1-5: returning to step 1-3 if k=k+1.

The RFAA method further includes analyzing an association relationship between IOC attackers, and a method for analyzing the association relationship between the IOC attackers is specifically as follows:

IOC providers are frequent providers who always appear together, and when the association relationship between the IOC attackers is analyzed, an index support number s(■) may be used to identify the frequent providers;

an association relationship between an IOC consumer and an IOC provider is described, it can be found that an IOC user and the IOC provider always appear at the same time, and the IOC consumer who always appears with the IOC provider at the same time can be determined; and if a quantity of the IOC providers is more than half of a quantity of providers in the current voting operation of a traffic-related event, the IOC attackers can successfully increase their reputation scores, if $V_i$ is a consumer, and $\Phi$ is a group of providers in the current event voting operation consuming traffic, $$\Phi_{\frac{1}{2}}$$

may be used to represent a set of the IOC providers, a quantity of $$\Phi_{\frac{1}{2}}$$

elements should be at least half of a quantity of elements according to a principle of majority decision, the quantity of $$\Phi_{\frac{1}{2}}$$

elements may be set as in formula (4):

$$\left|\Phi_{\frac{1}{2}}\right| = \left\lfloor \frac{|\Phi|}{2} \right\rfloor + 1, \quad (4)$$

for each $$V_j \in \Phi_{\frac{1}{2}},$$

the reputation fluctuation association rule may be designed as shown in formula (5):

$$s\left(V_i \to \Phi_{\frac{1}{2}}\right) \geq minsup, \quad (5)$$

and formula (5) is under a constraint of $\mu_j \geq 2$, where $\mu_j$ represents an index variable of a reputation fluctuation index of the provider $V_j$, $V_i$ is the consumer, $V_j$ is the provider, and minsup is a minimum value of support counts; and a provider meets formula (5) is classified as an attacker.

The method for analyzing the association relationship between the IOC attackers further includes a dynamic sampling observation method, including:

step 2-1: setting an initial value of minsup to a preset value;

step 2-2: checking a quantity h of detected IOC attacks;

step 2-3: outputting an average value of support counts by using a $$\operatorname*{mean}_{1 \leq h \leq m}\left(s\left(V_i \to \Phi_{\frac{1}{2}}\right)\right)_h$$

function, obtaining a minimum support count by using a $$\operatorname*{min}_{1 \leq h \leq m}\left(s\left(V_i \to \Phi_{\frac{1}{2}}\right)\right)_h$$

function, updating the value of minsup by using the minimum support count, and proceeding to step 2-5;

$$\operatorname*{mean}_{1 \leq h \leq m}\left(s\left(V_i \to \Phi_{\frac{1}{2}}\right)\right)_h \leq \operatorname*{mean}_{1 \leq h \leq m}\left(s\left(V_i \to \Phi_{\frac{1}{2}}\right)\right)'_h$$

step 2-4: determining, by using, whether a determining formula is valid, performing step 2-5 if the determining formula is invalid, obtaining the minimum support count by using a $$\operatorname*{min}_{1 \leq h \leq m}\left(s\left(V_i \to \Phi_{\frac{1}{2}}\right)\right)'_h$$

function if the determining formula is valid, updating the value of minsup by using the minimum support count, and proceeding to step 2-5; and step 2-5: checking another h detected IOC attacks, obtaining an average value of support counts by using a $$\operatorname*{mean}_{1 \leq h \leq m}\left(s\left(V_i \to \Phi_{\frac{1}{2}}\right)\right)'_h$$

function, and returning to step 2-4, where i, h, and m are natural numbers.

The deleting an unlikely IOC provider includes the following steps:

step 3-1: initializing $\Phi = \Phi_1 = \Phi_2 = \emptyset$, and setting dr=0 and $$\left|\Phi_{\frac{1}{2}}\right| = \left\lfloor \frac{|\Phi|}{2} \right\rfloor + 1,$$

where $\Phi$ represents a set of the all providers, $\Phi_1$ represents a set of providers that are not deleted from $\Phi$, $\Phi_2$ represents a set of providers that are not deleted from $\Phi_1$, and dr=0 indicates that a current voting action of a traffic-related event is safe under no IOC attacks;

step 3-2: traversing each provider $V_j$ that belongs to $\Phi$, and determining whether $\mu_j \geq 2$ one by one, and if $\mu_j \geq 2$, determining that $\Phi_1 \leftarrow \{V_j\}$ belongs to $\Phi$, where $\mu_j$ is an index variable of a reputation fluctuation index of the provider $V_j$;

step 3-3: traversing each provider $V_j$ that belongs to $\Phi$ if $$|\Phi_1| \geq \left|\Phi_{\frac{1}{2}}\right|,$$

if $s(V_i \rightarrow V_j) \geq minsup$, determining that $\Phi_2 \leftarrow \{V_j\}$ belongs to $\Phi_2$, where $V_i$ represents the consumer, otherwise, determining that dr=0, and the current voting action of a traffic-related event is safe under no IOC attacks;

step 3-4: if $$|\Phi_2| \geq \left|\Phi_{\frac{1}{2}}\right|,$$

determining that $$\Phi_{\frac{1}{2}} = \Phi_2,$$

otherwise, determining that dr=0, and the current voting action of a traffic-related event is safe under no IOC attacks; and step 3-5: traversing each $V_j$ that belongs to $\Phi_{1/2}$, searching a P-$C_j$ table, and if $$s\left(V_i \rightarrow \Phi_{\frac{1}{2}}\right) \geq minsup,$$

determmining that dr=1, and an IOC attack is detected, otherwise, determining that dr=0, and the voting action of a traffic-related event is safe under no IOC attacks.

The present disclosure has the following beneficial effects:

The present disclosure can repair a vulnerability, of a reputation system in the IoV, that the IOC attackers can manipulate the TMAM by increasing their own reputation scores in an IOC manner. In addition, the present disclosure can detect IOC attacks quickly to improve the security of the IoV; can eliminate suspicious providers recursively and provide a reputation fluctuation association rule, to avoid overload of the TMAM; and can deprive IOC attackers of the opportunity to improve their reputation scores and ensure credible information in the IoV, to ensure the fairness and availability of the TMAM without the interference from the IOC attackers.

DETAILED DESCRIPTION OF THE EMBODIMENTS

The present disclosure is further described below with reference to the accompanying drawings and embodiments.

Figure 3:
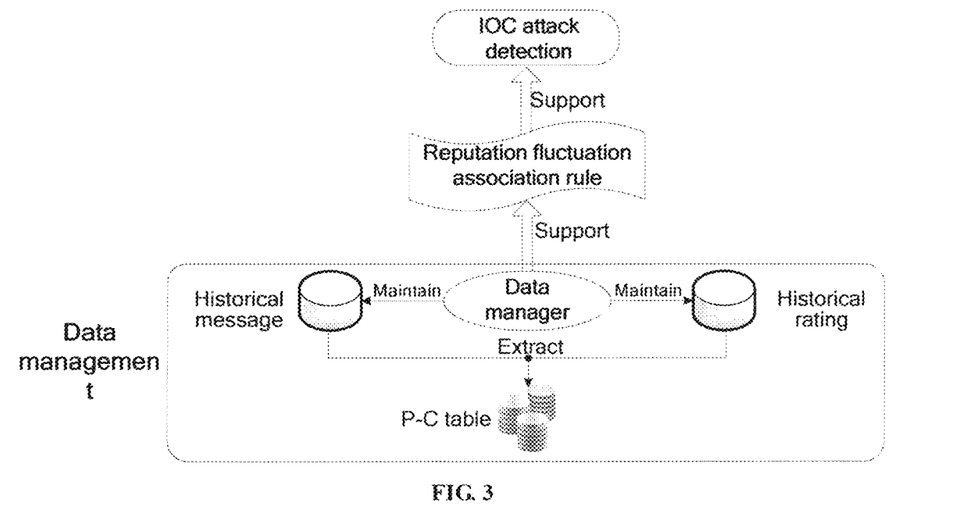
FIG. 3 is a schematic diagram of a framework of RFAA according to the present disclosure.
Figure 4:
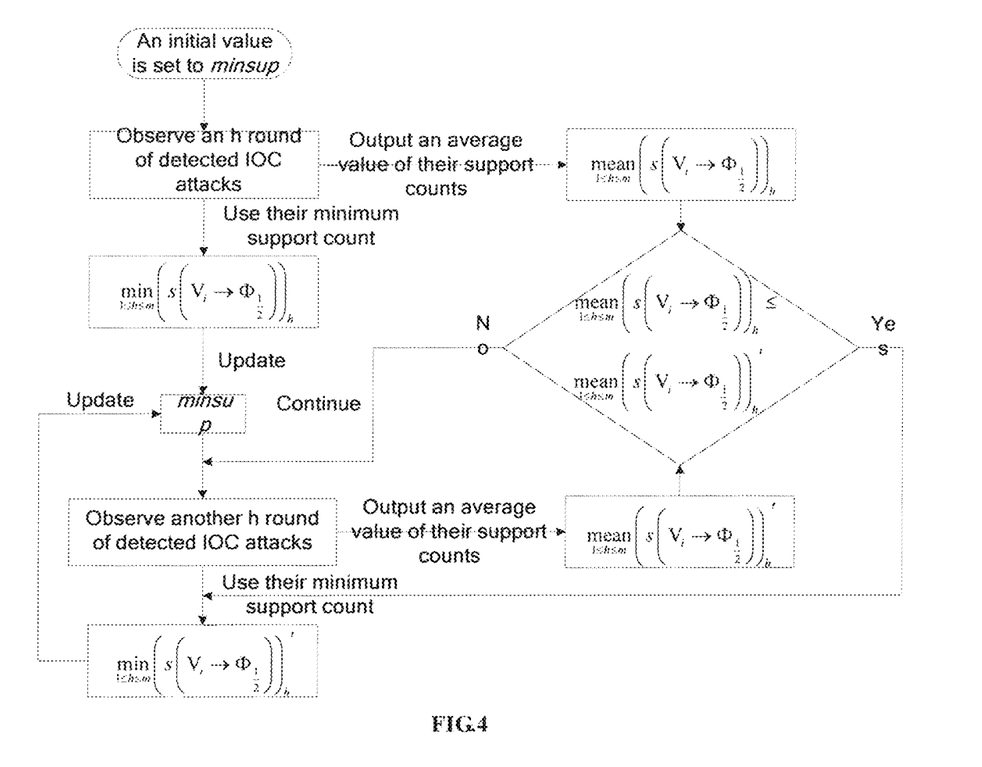
FIG. 4 is a flowchart of an operation of a dynamic sampling observation method according to the present disclosure.
Figure 5:
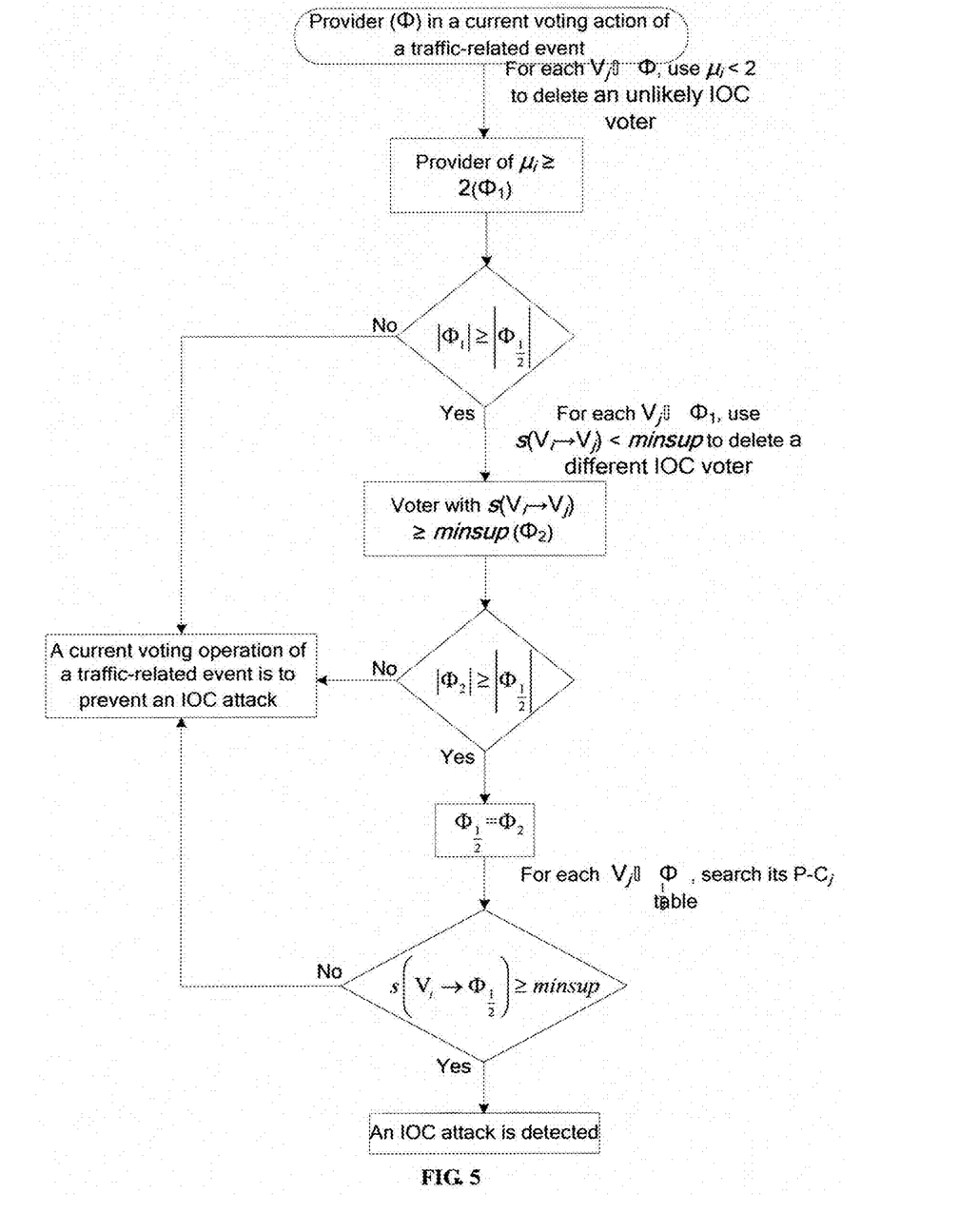
FIG. 5 is a flowchart of detecting an IOC attack according to the present disclosure.

As show in FIG. 3 to FIG. 5, when a system for securely defensing against a collusion attack under IoV is under an IOC attack, two-dimensional damage is caused on the performance of a TMAM, and the IOC attackers damage the fairness and availability of the TMAM more easily. IOC consumers may send ratings based on the information of accomplices. After several rounds of attacks, the IOC attackers may help each other to quickly obtain relatively high reputation scores, thereby making it easier to operate TMAM. In the related art, the attacker only plays as the provider, and sometimes improves its reputation score completely based on its honest actions.

The IOC attacks may affect trusted vehicles because they may not use credible information to improve their reputation scores. If their credible information is different from the ratings of the IOC consumers, their reputation scores are not improved. In the related art, the credible information can improve the reputation scores of credible vehicles.

The core of the system and method for securely defensing against a collusion attack under IoV and the method thereof in the present disclosure is to use the design idea of the RFAA to design a defensive scheme for quickly detecting IOC attacks. The difference between the present disclosure and the related art is as follows:

The RFAA is used to detect an IOC attack, analyze a reputation fluctuation characteristic, and delete an unlikely IOC provider from all providers in a current event voting operation consuming traffic. A quantitative method of reputation fluctuation characteristics is given in the RFAA method. In the present disclosure, it is found that the minority of individuals cannot change the decision of the TMAM according to a majority principle. If a quantity of reputation fluctuation characteristics of a provider is smaller than those of the most providers, the current event voting action consuming traffic is safe under no IOC attacks, because it is impossible for the minority of individuals to use the TMAM. In the related art, the cluster analysis is used to detect collusion attacks, and cannot find in advance whether the suspicious providers are a minority of individuals in all providers. Therefore, in the related art, more time is wasted to detect whether the current voting action of a traffic-related event is safe.

It may be noted that a provider rarely appears with a consumer, and also rarely appears with the consumer and another provider. In the present disclosure, a second step may be performed to delete the unlikely IOC providers by analyzing the association relationship (the support counts are used for quantification) between the consumer and each provider. In this case, the suspicious providers still account for the majority and have reputation fluctuation characteristics. In the related art, only the relationship between providers is analyzed during the detection of collusion attacks.

By narrowing the range of the suspicious providers, a quantity of searches in the database can be reduced, to support the reputation fluctuation association rule, for detecting IOC attacks, provided in the RFAA method. When an IOC attack is detected, the present invention should abandon the current voting action of a traffic-related event, thereby depriving the IOC attacker of the opportunity to improve its reputation score. In the related art, it is necessary to detect all collusion attackers, which may also increase the overload of the TMAM.

The system for securely defending against a collusion attack under IoV includes a cloud server of an IoV platform or a RSU in a distributed IoV; and an on-board unit disposed on a vehicle, where the on-board unit is connected to the cloud server of the IoV platform or the RSU in the distributed IoV, the on-board unit includes a processor, the processor may be a PLC, a single-chip microcomputer, a DSP processor, or an ARM processor, the processor is connected to a wireless communication module, the wireless communication module may be a 3G module or a 4G module connected to the IoV platform, the processor is further connected to a memory, and the memory may be a flash memory or an external memory.

The cloud server of the IoV platform or the RSU in the distributed IoV includes a TMAM; and the TMAM is configured to store a historical message from a provider and historical rating data of a consumer at the end of a voting campaign consuming traffic.

The method for securely defending against a collusion attack under IoV is performed on a cloud server of an IoV platform or a RSU in a distributed IoV and includes:

detecting an IOC attack by using a RFAA method, analyzing a reputation fluctuation characteristic, and deleting an unlikely IOC provider from all providers in a current event voting operation consuming traffic.

The current event voting operation consuming traffic mainly refers to a road-condition interaction event, that is, a voting action of a traffic-related event.

The RFAA includes:

(1) supporting data management for detecting an IOC attack, where the supporting data management for detecting the IOC attack includes two-step-based processing message report and consumer rating, and methods of the two-step-based processing message report and consumer rating are specifically as follows:

a TMAM should store a historical message from a provider and historical rating data of a consumer rather than abandoning them at the end of a voting operation consuming traffic, the provider provides a message for an on-board unit of a vehicle, and the consumer receives a message for the on-board unit of the vehicle and rates the message to complete the two-step-based processing message report; and to avoid that more time is spent in detecting IOC attacks, the provider's message should be based on the perspective of distinguishing the consumers, rather than being stored as a whole on all consumers, each vehicle $V_i$ may be assigned to a P-C table, the P-C table stores the message reported previously by the provider on the vehicle, and taking the vehicle $V_i$ as an example, messages provided by the all providers and ratings of $V_i$ are stored in the PC-table when the vehicle serves as the consumer, to complete the consumer rating; and (2) obtaining a reputation fluctuation association rule, where the obtaining reputation fluctuation association rule supports the detection of the IOC attack, and the reputation fluctuation association rule is determined by analyzing a characteristic of the IOC attack.

The P-C table is shown in Table 1:

TABLE 1

| sn | vt | P_ID (message) | | | | | C_ID (rating) |
|---|---|---|---|---|---|---|---|
| 1 | $vt_i^1$ | $V_1(m_1)_1$ $V_2(m_2)_1$ | ... | $V_j(m_j)_1$ | ... | $V_n(m_n)_1$ | $V_i(t)_1$ |
| 2 | $vt_i^2$ | $V_1(m_1)_2$ $V_2(m_2)_2$ | ... | $V_j(m_j)_2$ | ... | $V_n(m_n)_2$ | $V_i(t)_2$ |
| ... | ... | ... | ... | ... | ... | ... | ... |
| h | $vt_i^h$ | $V_1(m_1)_h$ $V_2(m_2)_h$ | ... | $V_j(m_j)_h$ | ... | $V_n(m_n)_h$ | $V_i(t)_h$ | where sn represents a number of a voting action of a traffic-related event, and h represents a quantity of voting actions that are related to a traffic event and initiated by the vehicle $V_i$;

vt represents a voting time when the vehicle $V_i$ requests a voting action of a traffic-related event, $vt_i^h$ represents a latest voting time of the vehicle $V_i$ at an $h^{th}$ time, and h is a natural number;

P_ID (message) includes an ID assigned to the provider and its historical message, and in $V_j(m_j)_h$, $V_j$, represents an ID of a $j^{th}$ provider, and $(m_j)_h$ represents an $h^{th}$ message in a voting operation of a traffic-related event; and specifically, when the $V_i$ reports "1", $V_j(m_j)_h$ is recorded as $V_j(1)_h$, when $V_i$ reports "0", $V_j(m_j)_h$ is recorded as $V_j(0)_h$, and when $V_i$ does not report, $V_j(m_j)_h$ is recorded as $V_j(-)_h$; and C_ID (rating data) includes an ID of the consumer and its historical rating, and in $V_i(t)_h$, $V_i$ represents an ID of an $i^{th}$ consumer, $(t)_h$ represents a corresponding real grade in an $h^{th}$ voting action of a traffic-related event, and i, j, and n are natural numbers and sequence numbers assigned to the vehicle.

A method of obtaining the reputation fluctuation association rule includes:

Because IOC attackers report credible messages to maintain relatively high reputation scores or manipulate the TMAM. The IOC attackers have reputation fluctuation characteristics. Therefore, an index variable $\mu$ of a reputation fluctuation index is introduced to quantify the reputation fluctuation characteristics of the IOC attackers. The index $\mu$ may be calculated by observing whether the reputation score of a vehicle continuously increases or decreases. Taking $V_i$ as another example, $R_i^k$ represents a reputation score of the vehicle $V_i$ at a $k^{th}$ time.

step 1-1: initializing a value of an index variable $\mu_i$ of a reputation fluctuation index to 0;

step 1-2: setting an initial value of an integer variable k to 1;

step 1-3: comparing the value of the integer variable k with h, where if k>h, the comparison is finished, and the method of obtaining the reputation fluctuation association rule is obtained; and if k≤h, $R_i^k \geq \varepsilon+\eta_2$, $R_i^k \leq R_i^{k-1}$, $R_i^k$ continuously decreases, and $R_i^k \leq \varepsilon+\eta_1$, $\mu_i=\mu_i+1$, where the continuous decrease of $R_i^k$ indicates that values from $R_i^j$ to $R_i^k$ decrease, h is a quantity of voting actions that are related to a traffic event and initiated by the vehicle $V_i$, $R_i^k$ represents a $k^{th}$ reputation score of the vehicle $V_i$, $\varepsilon$ as a reputation score threshold is always set to a moderate value in a range of 0 to 1, for example, 0.5, a value range of $\eta_1$ as a reputation warning line is $0 \leq \eta_1 < \varepsilon$, and a value range of $\eta_2$ as a high reputation line is $\eta_1 < \eta_2 \leq \varepsilon$;

step 1-4: if $R_i^k \leq \varepsilon+\eta_1$, $R_i^k \geq R_i^{k-1}$, $R_i^k$ continuously decreases, and $R_i^k \geq \varepsilon+\eta_2$, $\mu_i=\mu_i+1$; and step 1-5: returning to step 1-3 if k=k+1.

Through the method of obtaining the reputation fluctuation association rule, $\mu_i$ may be updated at the end of each voting action of a traffic-related event, to avoid that the redundancy of $\mu_i$ is calculated during the detection of IOC attacks. $\mu_i \geq 2$ indicates that an attacker has launched at least a round of IOC attacks to improve its reputation score and reported misinformation. Certainly, some malicious vehicles that behave honestly may sometimes make $\mu_i \geq 2$. Therefore, a range of filtering suspicious providers may be narrowed according to the obtained reputation fluctuation association rule. To effectively detect the IOC attackers, it is also necessary to analyze the association relationship between the IOC attackers.

The present disclosure analyzes the association relationship between IOC attackers based on the following three characteristics.

Co-attackers: the IOC attackers always report messages together.

Role exchange: the IOC attacker may play as an IOC consumer to help its accomplice play as an IOC provider, after a round of IOC attacks, one of the IOC providers is designated as a new IOC consumer, and a previous IOC consumer may become a new IOC provider.

A majority rule: a decision of the TMAM should be consistent with those of the majority of individuals.

The RFAA method further includes analyzing an association relationship between IOC attackers, and a method for analyzing the association relationship between the IOC attackers is specifically as follows:

As for the first characteristic, the IOC providers may also be frequent providers who always appear together, and when the association relationship between the IOC attackers is analyzed, an index support number s(■) may be used to identify the frequent providers. For example, If $V_1$, $V_2$, and $V_3$ are three frequent providers, their support counts are $s(V_1, V_2, V_3)$, which are quantities of appearances of $V_1$, $V_2$, and $V_3$ at the same time, and $s(V_1, V_2, V_3)$ should meet the following rule by searching the P-C table.

$$s(V_1, V_2, V_3) \geq minsup \qquad (2),$$

where minsup is a minimum value of the support counts.

As for the second characteristic, an association relationship between an IOC consumer and an IOC provider is described, and it may be further found that the IOC consumer and the IOC provider always appear together at the same time. For example, if $V_6$ is an IOC consumer, and $V_1$, V2, and V3 are three IOC providers, the relationship between them may be described as $V6 \to \{V_1, V_2, V_3\}$.

As for the third characteristic, if a quantity of the IOC providers is more than half of a quantity of providers in the current voting operation of a traffic-related event, the IOC attackers can successfully improve their reputation scores. For example, $V_6$ is still an IOC consumer, and $V_1$, $V_2$, $V_3$, $V_4$, and $V_5$ are providers of a current voting campaign of a traffic-related event. $V_1$, $V_2$, and $V_3$ can manipulate the TMAM, because they are most of the providers. According to association analysis rule formula (3), $V_6$, $V_1$, $V_2$, and $V_3$ may be identified as IOC attackers, $$s(V_6 \to \{V_1, V_2, V_3\}) \geq minsup \qquad (3).$$

Generally, if $V_i$ is a consumer, and $\Phi$ is a group of providers in the current event voting operation consuming traffic, $$\Phi_{\frac{1}{2}}$$

may be used to represent a set of the IOC providers, a quantity of $$\Phi_{\frac{1}{2}}$$

elements should be at least half of a quantity of elements according to a principle of majority decision, the quantity of $$\Phi_{\frac{1}{2}}$$

elements may be set as in formula (4):

$$\left|\Phi_{\frac{1}{2}}\right| = \left\lfloor \frac{|\Phi|}{2} \right\rfloor + 1, \qquad (4)$$

for each $$V_j \in \Phi_{\frac{1}{2}},$$

the reputation fluctuation association rule may be designed as shown in formula (5):

$$s\left(V_i \to \Phi_{\frac{1}{2}}\right) \geq minsup, \qquad (5)$$

and formula (5) is under a constraint of $\mu_j \geq 2$, where $\mu_j$ represents an index variable of a reputation fluctuation index of the provider $V_j$, $V_i$ is the consumer, $V_j$ is the provider, and minsup is a minimum value of support counts; and a provider meets formula (5) is classified as an attacker. In this way, providers that meet formula (5) are classified as the IOC attackers.

In addition, the present disclosure also provides a dynamic sampling observation method to ensure that the value of minsup is flexibly set. With the increase of a plurality of rounds of IOC attacks, the supports of the IOC consumers and providers also increase. Therefore, it is impossible to set minsup to a static value, but minsup may be dynamically updated as the quantity of IOC attacks increases.

In the current voting action of a traffic-related event, if reputation fluctuation association rule is feasible, IOC attacks can be detected. In such a case, the current voting action of a traffic-related event should be abandoned, to deprive the IOC attackers of the opportunity to improve their reputation scores.

The method for analyzing the association relationship between the IOC attackers further includes a dynamic sampling observation method, including:

step 2-1: setting an initial value of minsup to a preset value;

step 2-2: checking a quantity h of detected IOC attacks;

step 2-3: outputting an average value of support counts by using a $$\underset{1 \leq h \leq m}{\text{mean}}\left(s\left(V_i \to \Phi_{\frac{1}{2}}\right)\right)_h$$

function, obtaining a minimum support count by using a $$\min_{1\leq h\leq m}\left(s\left(V_i \to \Phi_{\frac{1}{2}}\right)\right)_h$$

function, updating the value of minsup by using the minimum support count, and proceeding to step 2-5;

step 2-4: determining, by using $$\operatorname{mean}_{1\leq h\leq m}\left(s\left(V_i \to \Phi_{\frac{1}{2}}\right)\right)_h \leq \operatorname{mean}_{1\leq h\leq m}\left(s\left(V_i \to \Phi_{\frac{1}{2}}\right)\right)_h',$$

whether a determining formula is valid, performing step 2-5 if the determining formula is invalid, obtaining the minimum support count by using a $$\min_{1\leq h\leq m}\left(s\left(V_i \to \Phi_{\frac{1}{2}}\right)\right)_h'$$

function if the determining formula is valid, updating the value of minsup by using the minimum support count, and proceeding to step 2-5; and step 2-5: checking another h detected IOC attacks, obtaining an average value of support counts by using a $$\min_{1\leq h\leq m}\left(s\left(V_i \to \Phi_{\frac{1}{2}}\right)\right)_h'$$

function, and returning to step 2-4, where i, h, and m are natural numbers.

The deleting an unlikely IOC provider includes the following steps:

step 3-1: initializing $\Phi=\Phi_1=\Phi_2=\emptyset$, and setting dr=0 and $$\left|\Phi_{\frac{1}{2}}\right| = \left\lfloor\frac{|\Phi|}{2}\right\rfloor + 1,$$

where $\Phi$ represents a set of the all providers, $\Phi_1$ represents a set of providers that are not deleted from $\Phi$, $\Phi_2$ represents a set of providers that are not deleted from $\Phi_1$, dr=0 indicates that a current voting action of a traffic-related event is safe under no IOC attacks, dr is a determining mark, and dr=1 indicates that there is an attack;

step 3-2: traversing each provider $V_j$ that belongs to $\Phi$, and determining whether $\mu_j \geq 2$ one by one, and if $\mu_j \geq 2$, determining that $\Phi_1 \leftarrow \{V_j\}$ belongs to $\Phi$, where $\mu_j$ is an index variable of a reputation fluctuation index of the provider $V_j$;

step 3-3: traversing each provider $V_j$ that belongs to $\Phi_1$ if $$|\Phi_1| \geq \left|\Phi_{\frac{1}{2}}\right|,$$

if $s(V_i \to _j) \geq$ minsup, determining that $\Phi_2 \leftarrow \{V_j\}$ belongs to $\Phi_2$, where $V_i$ represents the consumer, otherwise, determining that dr=0, and the current voting action of a traffic-related event is safe under no IOC attacks;

step 3-4: if $$|\Phi_2| \geq \left|\Phi_{\frac{1}{2}}\right|,$$

determining that $$\Phi_{\frac{1}{2}} = \Phi_2,$$

otherwise, determining that dr=0, and the current voting action of a traffic-related event is safe under no IOC attacks; and step 3-5: traversing each $V_j$ that belongs to $\Phi_{1/2}$, searching a P-$C_j$ table, and if $$s\left(V_i \to \Phi_{\frac{1}{2}}\right) \geq minsup,$$

determining that dr=1, and an IOC attack is detected, otherwise, determining that dr=0, and the voting action of a traffic-related event is safe under no IOC attacks.

With the support of the reputation fluctuation association rule, the goal of the present disclosure is to quickly detect IOC attacks to reduce the time of detecting IOC attacks and avoid overload of the TMAM. The basic idea of the RFAA method for detecting IOC attacks may be described as a recursive elimination method to reduce suspicious providers. In the current voting operation of a traffic-related event, it is unlikely to delete IOC providers. The process of detecting the IOC attacks is shown in FIG. 5.

In the first step, the reputation fluctuation index may be used to delete the unlikely IOC providers, and $\Phi_1$ irepresents the set of remaining providers that are not deleted from $\Phi$. If $$|\Phi_1| \geq \left|\Phi_{\frac{1}{2}}\right|,$$

the current voting operation of a traffic-related event is under no IOC attacks, and the detection may be withdrawn.

Usually, if a provider rarely appears with $V_i$, it also rarely appears with $V_i$ and another provider. Therefore, the second step may be performed to delete the unlikely IOC providers by analyzing the support count between the consumer ($V_i$) and each provider ($V_j$) in $\Phi_1$. $\Phi_2$ represents providers that are not deleted from $\Phi_1$. If $$|\Phi_2| \geq \left|\Phi_{\frac{1}{2}}\right|,$$

the current voting campaign of a traffic-related event is safe under no IOC attacks, and the detection may be withdrawn.

A quantity of searches in the P-C table can be significantly reduced through the two steps. For each $$V_j \in \Phi_{\frac{1}{2}},$$

the reputation fluctuation association rule may be used to search the P-C table to detect IOC attacks. $\Phi$, $\Phi_1$ and $\Phi_2$ are set variables.

The embodiments of the present disclosure are described above. Those skilled in the art should understand that the present disclosure is not limited to the embodiments described above, and various changes, modifications, and replacements can be made without departing from the scope of the present invention.

What is claimed is:

1. A method for securely defensing against a collusion attack under Internet of Vehicles (IoV), performed on a cloud server of an IoV platform or a roadside unit (RSU) in a distributed IoV, and comprising:
   detecting an inside-and-outside collusion (IOC) attack by using a reputation fluctuation association analysis (RFAA) method, analyzing a reputation fluctuation characteristic, and deleting an unlikely IOC provider from all providers in a current event voting operation consuming traffic,
   wherein the RFAA comprises:
   (1) supporting data management for detecting the IOC attack, wherein the supporting data management for detecting the IOC attack comprises two-step-based processing message report and consumer rating, and methods of the two-step-based processing message report and consumer rating are specifically as follows:
   a TMAM stores a historical message from a provider and historical rating data of a consumer at the end of a voting operation consuming traffic, the provider provides a message for an on-board unit of a vehicle, and the consumer receives a message for the on-board unit of the vehicle and rates the message to complete the two-step-based processing message report; and
   each vehicle $V_i$ is assigned to a P-C table, the P-C table stores the message reported previously by the provider on the vehicle, messages provided by the all providers, and ratings of $V_i$ when the vehicle serves as the consumer, to complete the consumer rating, and
   (2) obtaining a reputation fluctuation association rule, wherein the obtaining reputation fluctuation association rule supports the detection of the IOC attack, and the reputation fluctuation association rule is obtained by analyzing a characteristic of the IOC attack;
   wherein the obtaining a reputation fluctuation association rule comprises:
   step 1-1: initializing a value of an index variable $\mu_i$ of a reputation fluctuation index to 0;
   step 1-2: setting an initial value of an integer variable k to 1;
   step 1-3: comparing the value of the integer variable k with h, wherein if k>h, the comparison is finished, and the method of obtaining the reputation fluctuation association rule is obtained; and if k≤h, $R^k_i \geq \varepsilon+\eta_2$, $R^k_i \leq R^{k-1}_i$, $R^k_i$ continuously decreases, and $R^k_i \leq \varepsilon+\eta_1$, $\mu_i=\mu_i+1$, wherein h is a quantity of voting actions that are related to a traffic event and initiated by a vehicle $V_i$, $R^k_i$ represents a $k^{th}$ reputation score of the vehicle $V_i$, $\varepsilon$ as a reputation score threshold is always set to a moderate value in a range of 0 to 1, a value range of $\eta_1$ as a reputation warning line is $0 \leq \eta_1 < \varepsilon$, and a value range of $\eta_2$ as a high reputation line is $\eta_1 < \eta_2 \leq \varepsilon$.
   step 1-4: if $R^k_i \leq \varepsilon+\eta_1$, $R^k_i \geq R^{k-1}_i$, $R^k_i$ continuously decreases, and $R^k_i \geq \varepsilon+\eta_2$, $\mu_i=\mu_i+1$; and
   step 1-5: returning to step 1-3 if k=k+1;
   wherein the detecting an IOC attack by using a RFAA method further comprises analyzing an association relationship between IOC attackers, and a method for analyzing the association relationship between the IOC attackers is specifically as follows:

IOC providers are frequent providers who always appear together, and when the association relationship between the IOC attackers is analyzed, an index support numbers (Ø) is used to identify the frequent providers;
an association relationship between an IOC consumer and an IOC provider is described, it can be found that an IOC user and the IOC provider always appear at the same time, and the IOC consumer who always appears with the IOC provider at the same time are determined; and
if a quantity of the IOC providers is more than half of a quantity of providers in the current voting operation of a traffic-related event, the IOC attackers can successfully increase their reputation scores,
if $V_i$ is a consumer, and $\Phi$ is a group of providers in the current event voting operation consuming traffic, $$\Phi_{\frac{1}{2}}$$

is used to represent a set of the IOC providers, a quantity of $$\Phi_{\frac{1}{2}}$$

elements is at least half of a quantity of elements according to a principle of majority decision, the quantity of $$\Phi_{\frac{1}{2}}$$

elements is set as in formula (4):

$$\left|\Phi_{\frac{1}{2}}\right| = \left\lfloor \frac{|\Phi|}{2} \right\rfloor + 1, \tag{4}$$

for each $$V_j \in \Phi_{\frac{1}{2}},$$

the reputation fluctuation association rule is designed as shown in formula (5):

$$s\left(V_i \to \Phi_{\frac{1}{2}}\right) \geq minsup, \text{ and} \tag{5}$$

formula (5) is under a constraint of $\mu_i \geq 2$, wherein $\mu_i$ represents an index variable of a reputation fluctuation index of the provider $V_i$, $V_i$ is the consumer, $V_j$ is the provider, and minsup is a minimum value of support counts; and a provider meets formula (5) is classified as an attacker;
wherein the method for analyzing the association relationship between the IOC attackers further comprises a dynamic sampling observation method, comprising:
step 2-1: setting an initial value of minsup to a preset value;

step 2-2: checking a quantity h of detected IOC attacks;
step 2-3: outputting an average value of support counts by using a $$\operatorname*{mean}_{1\leq h\leq m}\left(s\left(V_i \to \Phi_{\frac{1}{2}}\right)\right)_h$$

function, obtaining a minimum support count by using a $$\min_{1\leq h\leq m}\left(s\left(V_i \to \Phi_{\frac{1}{2}}\right)\right)_h$$

function, updating the value of minsup by using the minimum support count, and proceeding to step 2-5;
step 2-4: determining, by using $$\operatorname*{mean}_{1\leq h\leq m}\left(s\left(V_i \to \Phi_{\frac{1}{2}}\right)\right)_h \leq \operatorname*{mean}_{1\leq h\leq m}\left(s\left(V_i \to \Phi_{\frac{1}{2}}\right)\right)_h',$$

whether a determining formula is valid, performing step 2-5 if the determining formula is invalid, obtaining the minimum support count by using a $$\min_{1\leq h\leq m}\left(s\left(V_i \to \Phi_{\frac{1}{2}}\right)\right)_h'$$

function if the determining formula is valid, updating the value of minsup by using the minimum support count, and proceeding to step 2-5; and
step 2-5: checking another h detected IOC attacks, obtaining an average value of support counts by using a $$\operatorname*{mean}_{1\leq h\leq m}\left(s\left(V_i \to \Phi_{\frac{1}{2}}\right)\right)_h'$$

function, and returning to step 2-4, wherein i, h, and m are natural numbers.

2. The method for securely defending against a collusion attack under IoV according to claim 1, wherein the P-C table is shown in Table 1:

TABLE 1

| sn | vt | P_ID (message) | | | | | C_ID (rating) |
|---|---|---|---|---|---|---|---|
| 1 | $vt_i^1$ | $V_1(m_1)_1$ | $V_2(m_2)_1$ | ... | $V_j(m_j)_1$ | ... $V_n(m_n)_1$ | $V_i(t)_1$ |
| 2 | $vt_i^2$ | $V_1(m_1)_2$ | $V_2(m_2)_2$ | ... | $V_j(m_j)_2$ | ... $V_n(m_n)_2$ | $V_i(t)_2$ |
| ... | ... | ... | ... | ... | ... | ... | ... |
| h | $vt_i^h$ | $V_1(m_1)_h$ | $V_2(m_2)_h$ | ... | $V_j(m_j)_h$ | ... $V_n(m_n)_h$ | $V_i(t)_h$ | wherein sn represents a number of a voting action of a traffic-related event, and h represents a quantity of voting actions that are related to a traffic event and initiated by the vehicle $V_i$;

vt represents a voting time when the vehicle $V_i$ requests a voting action of a traffic-related event, $vt_i^h$ represents a latest voting time of the vehicle $V_i$ at an $h^{th}$ time, and h is a natural number;

P_ID (message) comprises an ID assigned to the provider and its historical message, and in $V_j(m_j)_h$, $V_j$ represents an ID of a $j^{th}$ provider, $(m_j)_h$ represents an $h^{th}$ message in a voting operation of a traffic-related event, and i, j, and n are natural numbers and sequence numbers assigned to the vehicle; and C_ID (rating data) comprises an ID of the consumer and its historical rating, and in $V_i(t)_h$, $V_i$ represents an ID of an $i^{th}$ consumer, $(t)_h$ represents a corresponding real grade in an $h^{th}$ voting action of a traffic-related event, and i, j, and n are natural numbers and sequence numbers assigned to the vehicle.

3. The method for securely defending against a collusion attack under IoV according to claim 1, wherein the deleting an unlikely IOC provider comprises the following steps:
step 3-1: initializing $\Phi=\Phi_1=\Phi_2=\emptyset$, and setting dr=0 and $$\left|\Phi_{\frac{1}{2}}\right| = \left\lfloor \frac{|\Phi|}{2} \right\rfloor + 1,$$

wherein $\Phi$ represents a set of the all providers, $\Phi_1$ represents a set of providers that are not deleted from $\Phi$, $\Phi_2$ represents a set of providers that are not deleted from $\Phi_1$, dr=0 indicates that a current voting action of a traffic-related event is safe under no IOC attacks, dr is a determining mark, and dr=1 indicates that there is an attack;

step 3-2: traversing each provider $V_j$ that belongs to $\Phi$, and determining whether $\mu_j \geq 2$ one by one, and if $\mu_j \geq 2$, determining that $\Phi_1 \leftarrow \{V_j\}$ belongs to $\Phi$, wherein $\mu_j$ is an index variable of a reputation fluctuation index of the provider $V_j$;

step 3-3: traversing each provider $V_j$ that belongs to $\Phi_1$ if $$|\Phi_1| \geq \left|\Phi_{\frac{1}{2}}\right|,$$

if $s(V_i \to V_j) \geq$ minsup, determining that $\Phi_2 \leftarrow \{V_j\}$ belongs to $\Phi_2$, wherein $V_i$ represents the consumer, otherwise, determining that dr=0, and the current voting action of a traffic-related event is safe under no IOC attacks;

step 3-4: if $$|\Phi_2| \geq \left|\Phi_{\frac{1}{2}}\right|,$$

determining that $$\Phi_{\frac{1}{2}} = \Phi_2,$$

otherwise, determining that dr=0, and the current voting action of a traffic-related event is safe under no IOC attacks; and step 3-5: traversing each $V_j$ that belongs to $\Phi_{1/2}$, searching a P-$C_j$ table, and if $$s\left(V_i \to \Phi_{\frac{1}{2}}\right) \geq minsup,$$

determining that dr=1, and an IOC attack is detected, otherwise, determining that dr=0, and the voting action of a traffic-related event is safe under no IOC attacks.

* * * * *